United States Patent
Gubler et al.

(10) Patent No.: US 6,290,029 B1
(45) Date of Patent: Sep. 18, 2001

(54) COMPACT ADJUSTABLE WHEEL CHOCK ASSEMBLY FOR RETAINMENT OF MULTI-SIZE WHEELS

(76) Inventors: Tyler Wilson Gubler, 2481 River Front Dr., Santa Clara, UT (US) 84765; Kirkman Z. Mitchell, 522 Urie Cir., Washington, UT (US) 84780

( * ) Notice: Subject to any disclaimer, the term of this patent is extended or adjusted under 35 U.S.C. 154(b) by 0 days.

(21) Appl. No.: 09/749,184

(22) Filed: Dec. 26, 2000

(51) Int. Cl.[7] ............................................. B61H 13/00
(52) U.S. Cl. ................................................ 188/36; 188/4 R
(58) Field of Search ........................... 188/32, 36, 4 R; 410/30; 73/146, 117.3, 126, 127, 117

(56) References Cited

U.S. PATENT DOCUMENTS

| | | | |
|---|---|---|---|
| D. 254,432 | 3/1980 | Schessl | D12/217 |
| D. 283,022 | 3/1986 | Cameron | D12/217 |
| D. 307,575 | 5/1990 | Gano | D12/217 |
| D. 401,210 * | 11/1998 | Chiang | D12/217 |
| D. 409,133 | 5/1999 | Henry | D12/217 |
| D. 409,554 | 5/1999 | Henry | D12/217 |
| 3,799,069 | 3/1974 | Szala et al. | |
| 3,800,917 | 4/1974 | Vick | 188/32 |
| 3,810,530 | 5/1974 | Jay | 188/32 |
| 3,993,167 | 11/1976 | Reed | 188/32 |
| 4,140,206 | 2/1979 | Yamazaki | 188/32 |
| 4,804,070 | 2/1989 | Bohler | 188/32 |
| 4,867,278 | 9/1989 | Walton | 188/32 |
| 4,917,219 | 4/1990 | Henry | 188/32 |
| 5,137,121 | 8/1992 | Leonard | 188/32 |
| 5,294,221 * | 3/1994 | Eller et al. | 410/30 |
| 5,465,814 | 11/1995 | Ziaylek | 188/32 |
| 5,738,260 | 4/1998 | Kirtland | 224/215 |
| 5,913,389 | 6/1999 | Clark | 188/32 |
| 5,927,443 * | 7/1999 | Collins, Jr. | 188/32 |
| 6,050,137 * | 4/2000 | Merrill, Sr. | 73/146 |

OTHER PUBLICATIONS

Supply Catalog #32 1993 The Supply Corporation P.O. Box 100 Lake Geneva WI 53147 p. 116 Rubber Wheel Chocks Item #WCB Catalog #106 1996 McMaster–Carr Los Angeles, Calif. pp. 51009–1010 Wheel chocks.
Supply Catalog Fall 2000 Global Industrial Equipment New York, Georgia–Illinois–California Wheel p. 207 Chocks.

* cited by examiner

*Primary Examiner*—Robert J. Oberleitner
*Assistant Examiner*—Devon Kramer

(57) ABSTRACT

A novel compact adjustable wheel chock assembly for retainment of multi-size wheels (11) comprising of a one-piece flat rigid base plate (12) having a front-right surface (13), a front-left surface (14), a rear-right surface (15), a rear-left surface (16), a front-right wheel chock (17), mounted on the front-right surface (13) having a sideways adjustment device (19), a rear-right wheel chock (18) located on the rear-right surface (15), having a forward-backward adjustment device (20), a front-left wheel chock (21), mounted on the front-left surface (14), having a sideways adjustment device (23), a rear-left wheel chock (22) located on the rear-left surface (16), having a forward-backward adjustment device (24), an attachment hole (25) located on the front-right surface (13) and an attachment hole (26) located on the front-left surface (14) both having a mechanical device to attach the one-piece flat rigid base plate (12) to a supporting substructure surface, a tie-down strap (27) having a mechanical device to attach the tie-down strap (27) to the top of the front-right wheel chock (17) and attach opposite end of the tie-down strap (27) to the top of the rear-right wheel chock (18), a tie-down strap (28) having a mechanical device to attach the tie-down strap (28) to the top of the front-left wheel chock (21) and attach opposite end of the tie-down strap (28) to the top of the rear-left wheel chock (22).

5 Claims, 2 Drawing Sheets

COMPACT ADJUSTABLE WHEEL CHOCK ASSEMBLY FOR RETAINMENT OF MULTI-SIZE WHEELS

BACKGROUND—FIELD OF INVENTION

This invention relates in general to wheel chocks, in particular for retainment of multi-size wheels of different type of vehicles having wheels which need to be held in a fixed position during the act of being transported on a trailer-bed, truck-bed, railroad car-bed or any other type of transporter or being held in a fixed position on any substructure surface such as a garage floor, parking lot surface or any similar surface.

BACKGROUND DESCRIPTION OF PRIOR ART

Prior art wheel chocks are designed to prevent a wheel of a vehicle from moving, once chocked, in a forward direction or in a backward direction. Prior art wheel chocks are not designed in a compact adjustment mode with the ability to adjust in the sidewise direction and in the forward-backward direction all in one complete unit as my invention is designed with this multiphase feature. Prior art is not capable of having the multi-size wheel adjustment and does not have the ability to adjust for different wheel base widths. My invention has all these above mentioned features. The difficulties with the prior art wheel chocks, have been when parties have tried to use the individual wheel chocks to retain the vehicle wheel in a fixed position it only can chock a vehicle wheel by relying on the friction of the supporting surface to hold the wheel chock from sliding when the pressure by the wheel is applied against the prior art wheel chock. My invention does not rely on the friction of the supporting surface but my compact adjustable wheel chock has wheel chocks that are fixed on a base plate which is fixed to the substructure surface thereby not allowing the movement of the retained vehicle wheel. Prior art wheel chocks can move when a quick pull, twist or push movement of the vehicle that is being transported, for example, in the bed of a pick-up truck. There has been many pick-up beds and trailer beds damaged by the vehicle being transported coming loose causing it to move forward smashing the rear window or to move backward bending the tail gate. Prior art wheel chocks usefulness is greatly limited in that they are designed for chocking the wheels of a vehicle that is not being transported but fixed to a surface relying on friction only. My invention has the ability to not only chock a wheel on a stationary surface such as a garage floor, parking lot or any similar surface but also chock vehicle wheels that are being transported in the bed of a pick-up truck, bed of a trailer, railroad car and any other similar mode of transportation of vehicles. My invention has a rigid base plate which the wheel chock is attached as well as the rigid base plate is also attached to the transporter surface making it impossible to move because of a quick pull, twist or push movement of the transporter. The utility of my invention has a serviceable and useful desired design which is to not allow the vehicle being transported to come loose causing damage to the transporter vehicle.

Another type wheel chock that has been employed is the type that has only a right front and a left front chock with an adjustable bar between them allowing adjustment to accommodate different width wheel bases but lacks the ability to fix the wheel chock to the transporter surface. This prior art has only the front or rear but not both wheel chock allowing the vehicle being chocked to move in the opposite direction from the wheel chock because of only chocking one surface of the vehicle wheel. My invention has both the front as well as the rear of the vehicle wheel chocked thereby not allowing the vehicle wheel to move in either direction.

Another type wheel chock has a front and rear chock with a handle to move the wheel chock into or out of position of the vehicle wheel being chocked. This prior art lacks the ability to attach to the supporting surface allowing the wheel chock to move if there is a quick pull, twist or push movement of the vehicle chocked wheel. Therefore, this prior art wheel chock is not like my invention lacking the ability to hold the wheel or wheels in a fixed position when a quick pull, twist or push movement is applied to the vehicle wheel being chocked.

Another type wheel chock has an ornamental design for a wheel chock. It lacks the ability to hold the vehicle wheel being chocked in both a forward or backward direction. Therefore, this prior art design is not like my invention which has the ability to hold a vehicle wheel in a fixed position not allowing the chocked wheel to move in either a forward or backward direction. Also, my invention holds the chocked wheel from moving in upward direction because of the strap that goes over the diameter of the chocked wheel. This strap is fixed by a mechanical means to both wheel chocks.

Another type wheel chock has an ornamental design for a wheel chock. It lacks the ability to hold the wheel being chocked in both the forward and backward direction. Therefore, this wheel chock is not like my invention which has the ability to hold a wheel in both the forward or backward direction.

Another type wheel chock storage device is for storing a wheel chock on an automobile bumper. Therefore, this invention is not a wheel chock for chocking wheels but is for storage only. Therefore, this invention is not like my invention which is designed to chock a wheel.

Another type wheel chock apparatus which has the ability to be collapsible but lacks the ability to hold a wheel being chocked in both directions and lacks the ability to be attached to the supporting surface. Therefore, this wheel chock is not like my invention which has the ability to hold a wheel in a fixed position keeping it from moving in a forward or a backward direction. Also, my invention is capable of being attached to the supporting surface.

Another type wheel chock has the ability to secure a vehicle wheel for temporarily encumbering the normal rotation of a chock wheel. This invention lacks the ability to hold the wheel being chocked in both forward or backward direction. Therefore, this invention is not like my invention which has the ability to hold the wheel being chocked in a fixed position thereby not allowing the chocked wheel to move in either the forward or backward direction.

Another type wheel chock has an ornamental design for a wheel chock. It lacks the ability to hold the wheel being chocked in both the forward and backward direction. Therefore, this wheel chock is not like my invention which has the ability to hold a wheel in both the forward or backward direction.

Another type wheel chock which has an exterior shell of polyethylene comprising a base, a back surface, two side surfaces and a ramp surface as the hypotenuse between the base and back surfaces. It has a core of rigid foam of a secondary material. This invention lacks the ability to hold the chocked wheel from moving in either a forward or a backward direction. Therefore, this invention is not like my invention which has the ability to prevent the chocked wheel from moving in either the forward or backward direction.

Another type wheel chock device consisting of two components, one plate member having a flange at the end and a second plate having overlapping flange engaging sides, which can be assembled to form an inverted V-shaped wheel chocking device for use when changing a vehicles tire, during vehicle maintenance or when parking a vehicle on a hill. Therefore, this invention is not able to be permanently attached to the supporting surface and can stop the chocked wheel from moving in one direction only. My invention stops the chocked wheel from moving in both the forward or backward directions. Also, my invention has the ability to be attached to the supporting surface.

Another type wheel chock comprising a pair of wedge shaped chocks having a flat bottom which is designed to hold to the wheel being chocked but lacks the ability to permanently be attached to the supporting surface. Therefore, this invention lacks the feature of my invention which has the ability to be permanently attached to the supporting surface.

Another type wheel chock has an ornamental design for a wheel chock lacking the ability to be permanently attached to the supporting surface. My invention has the ability to be permanently attached to the supporting surface and to hold the chocked wheel or wheels in a fixed position when there is a quick pull, twist, or push movement. My invention has the ability to have a strap tie-down that goes over the chocked wheel and is attached to the front chock and rear chock preventing the chocked wheel from moving in an upward direction as well as in the forward or backward direction.

Another type wheel chock has an ornamental design for a wheel chock. It lacks the ability to hold the chocked wheel in a forward or backward direction. Therefore, this invention is not like my invention which has the ability to hold a chocked wheel in a fixed position not allowing a forward or backward movement as well as an upward movement.

Another type wheel chock is designed to be collapsible. This invention cannot be permanently attached to the supporting surface and cannot hold the chocked wheel from moving in a forward or backward direction. Therefore, my invention can be permanently attached to the supporting surface and is designed to hold the chocked wheel from moving in forward or backward, as well as upwards.

Another type wheel chock is designed to restrain movement of a stationary vehicle, the wheel chock comprising a solid body of resiliently flexible material, preferably rubber having a ground engaging surface and a generally concave wheel engaging surface. This invention lacks the ability to permanently attach to the supporting surface and allows the chocked wheel to move in the opposite direction of the wheel chock. Therefore, my invention is designed to hold the chocked wheel in a fixed position not allowing the chocked wheel to move in the upward direction, as well as in the forward or backward direction. My invention has the ability to be attached to the supporting surface.

Another type wheel chock for use primarily with trucks being of unitary construction and having parallel opposed complimentary side plated and a L-shaped member serving as a ramp plate and support plate portion. This invention is not designed for attaching to the supporting surface of a pick-up truck, trailer-bed, or railroad car-bed for transporting other vehicles. Therefore, this invention is lacking the design features of my invention. My invention has design features that allow the wheel chock to be attached to the supporting surface and my invention is designed to hold the chocked wheel or wheels in a fixed position not allowing the chocked wheel to move in an upward, forward, or backward direction.

Another type wheel chock has a form of a hollow wedge with a ribbed inclined tire gripping face and a base which is concave upwardly to form ground gripping rails whose contact area with the ground varies with the loading of the wedge. This invention lacks the ability to be permanently attached to the supporting surface and to prevent movement in the upwards and backwards direction. Therefore, this invention is not like my invention which holds the chocked wheel in a fixed position and has the ability to be attached to the supporting surface.

Another type wheel chock, automobile wheel chock designed as a restraining device comprising transversely extending bar means including a number of hold down finger portions inserted in perforated openings of longitudinally extending wheel guide rails to thereby forming a fixed restraining member about a wheel of the transported automobile. This invention is designed to fit on a rail not a base plate as my invention is designed to do. This invention is not like my invention. My invention is designed to fit a pick-up truck bed or a bed of a trailer used to haul other vehicles and other similar vehicles used to transport vehicles. My invention is designed to hold a wheel or wheels in a fixed position not allowing the chocked wheel to move in an upward, forward or backward direction.

OBJECTS AND ADVANTAGES

Accordingly, besides the objects and advantages described above, several objects and advantages of the present invention are:

(a) to provide a wheel chock assembly that is adjustable to different wheel base widths.

(b) to provide a wheel chock assembly that allows the adjustment for different size wheels.

(c) to provide a wheel chock assembly that has the ability to be permanently attached to the supporting surface of the transporter vehicle or to any other type supporting surface.

(d) to provide a wheel chock assembly that can be used in more than one type of transport vehicle.

(e) to provide a wheel chock assembly with the ability to hold a wheel being chocked in a fixed position with no movement when placed into the wheel chock assembly.

(f) to provide a wheel chock assembly that has compactness in design.

(g) to provide a wheel chock assembly having a tie-down strap which holds the vehicle wheel being chocked from moving in an upwards direction.

It is the feature of the present invention to provide an adjustable wheel chock assembly comprising of one rigid base plate, that can be made in one or more pieces, having one right-front chock in combination with one right-rear chock and one left-front chock in combination with one left-rear chock that are attached to the base plate with an adjustable device allowing the right-rear chock and left-rear chock to adjust individually in a forward and backward direction to facilitate proper adjustment for multi-size wheels. The combination of right chocks and the combination of left chocks having an adjustable device allowing the right chocks and left chocks to move individually in the sideways direction to facilitate proper adjustment for different wheel base widths. No prior art has combined these two features of an adjustable wheel chock assembly having a forward-backward and sideways directional adjustment. My invention has one tie-down strap on each chock combination with an attachment means at both ends of the tie-down strap and having an adjustment device to facilitate proper tight fit of the tie-down strap over the diameter of each chocked wheel. This tie-down strap will secure the chocked wheel by not allowing it to move in an upward direction. Some of the advantages of my invention over prior art wheel chocks are the adjustable features and the ability to be attached to the supporting surface of the transporting vehicle or any other type supporting surface. My invention can be quickly removed and stored at any time as required. My invention has a compact feature of being made as one complete assembly not having many loose parts that have to be stored individually giving the possibility of losing the different stored parts.

It is an object of the present invention to provide an improved compact adjustable wheel chock assembly for retainment of multi-size wheels.

Other object and features are readily apparent from the following embodiments thereof taken in conjunction with the accompanying drawings although variation and modifications may be affected without departing from the sphere and the scope of the normal concepts of the disclosed invention. You will find further objects and advantages of the invention from a consideration of the ensuring descriptions and accompanying drawings.

DRAWING FIGURES

Figure 1:
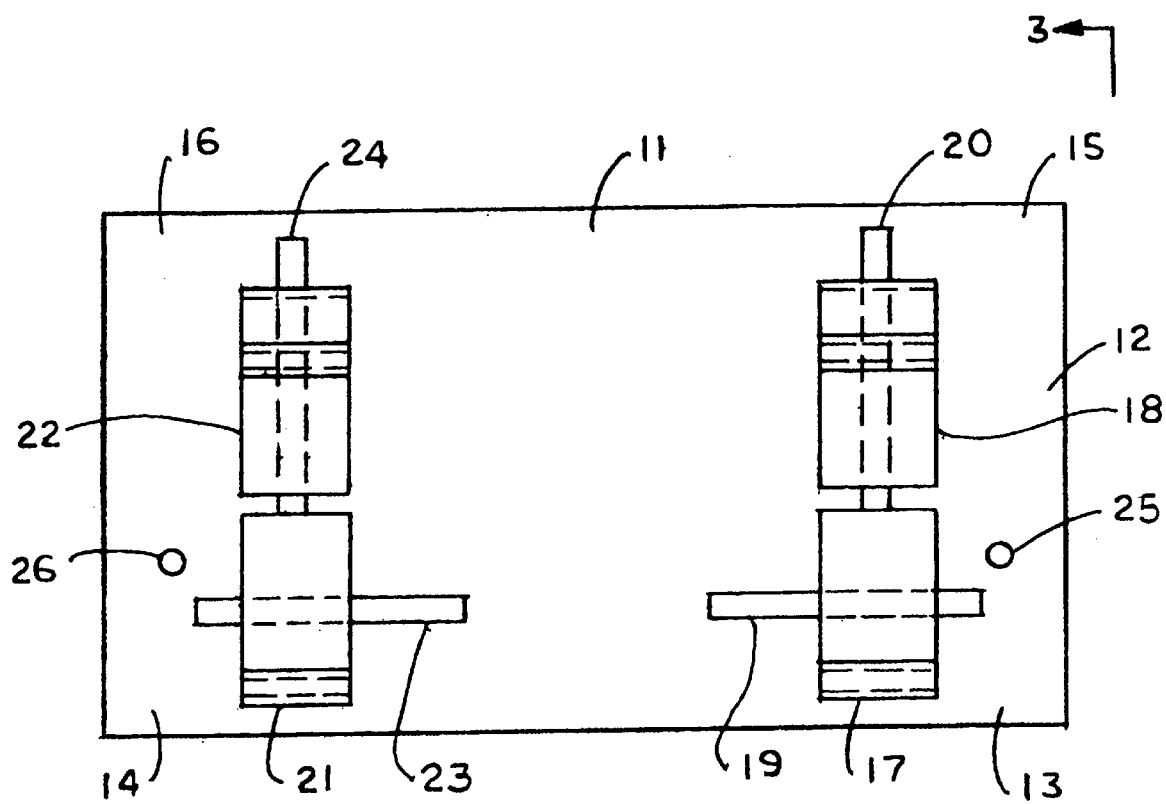
FIG. 1 Shows a top view of the compact adjustable wheel chock assembly.

DRAWING REFERENCE NUMERALS 11 compact adjustable wheel chock assembly
12 one-piece flat rigid base plate
13 front-right surface
14 front-left surface
15 rear-right surface
16 rear-left surface
17 front-right wheel chock
18 rear-right wheel chock
19 sideways adjustment device
20 forward-backward adjustment device
21 front-left wheel chock
22 rear-left wheel chock
23 sideways adjustment device
24 forward-backward adjustment device
25 attachment hole
26 attachment hole
27 tie-down strap
28 tie-down strap

DESCRIPTION OF INVENTION

Figure 2:
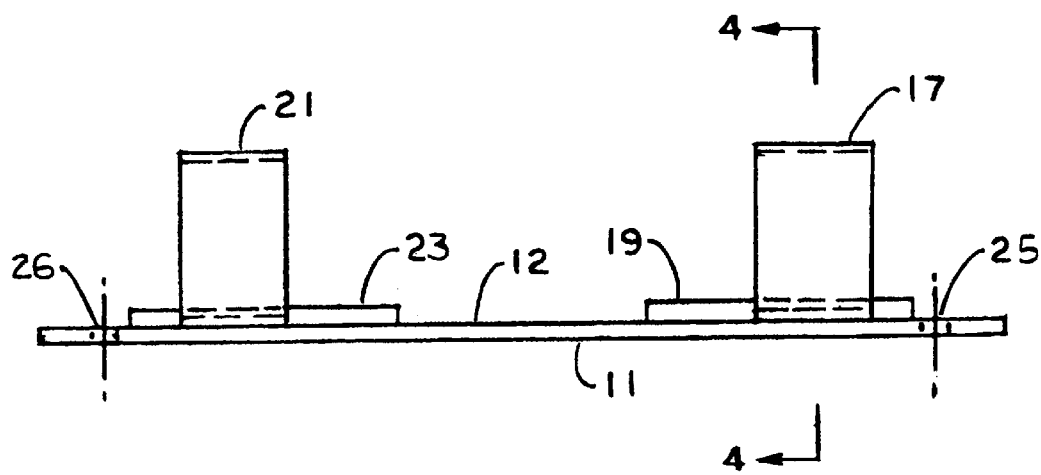
FIG. 2 Shows a front view of the compact adjustable wheel chock assembly.
Figure 3:
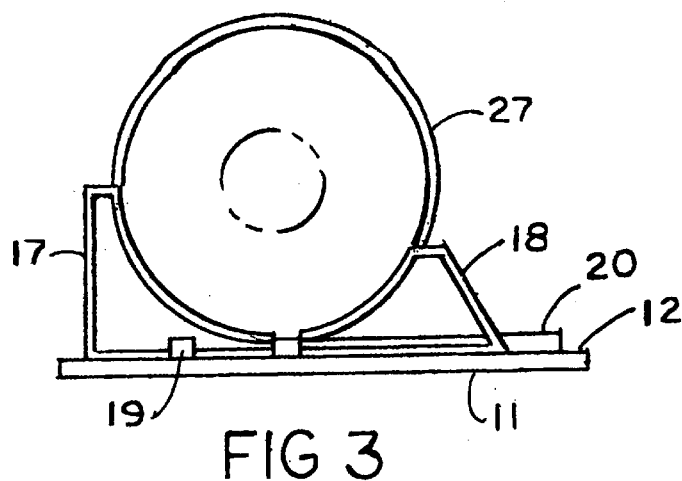
FIG. 3 Shows an end view of the compact adjustable wheel chock assembly with the tie-down strap placed over a referenced vehicle wheel in the wheel chock area, taken along the line 3—3 FIG. 1.
Figure 4:
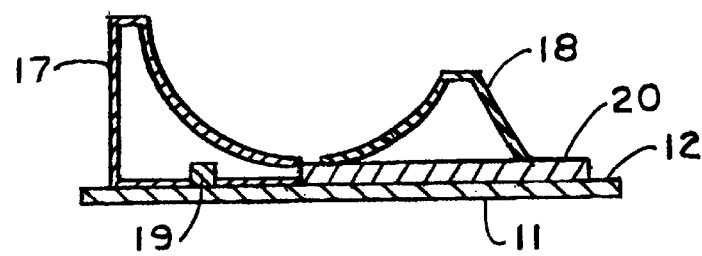
FIG. 4 Shows an end sectional view of the compact adjustable wheel chock assembly, taken along the line 4—4 FIG. 2.
Figure 5:
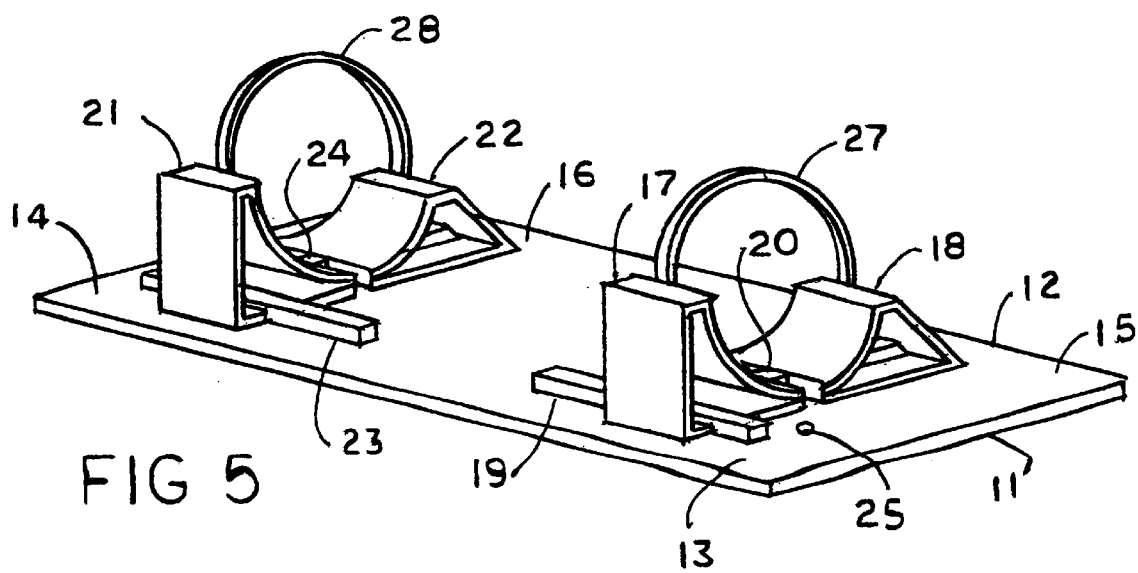
FIG. 5 Shows a perspective view of the compact adjustable wheel chock assembly in accordance with the invention.

The compact adjustable wheel chock assembly for retainment of multi-size wheels 11, shown in FIG. 1, FIG. 2, FIG. 3, FIG. 4, and FIG. 5, comprises a one-piece flat rigid base plate 12 having sufficient thickness, width and length having the following features: a front-right surface 13 having sufficient area, a front-left surface 14 having sufficient area, a rear-right surface 15 having sufficient area, a rear-eft surface 16 having sufficient area, a front-right wheel chock 17, mounted on said front-right surface 13, having sufficient thickness, width and length having a surface to accommodate the shape of a wheel having a sideways adjustment device 19, a rear-right wheel chock 18, located on said rear-right surface 15, having sufficient thickness, width and length having a surface to accommodate the shape of a wheel having a forward-backward adjustment device 20, a front-left wheel chock 21, mounted on said front-left surface 14, having sufficient thickness, width and length having a surface to accommodate the shape of a wheel having a sideways adjustment device 23, a rear-left wheel chock 22, located on said rear-left surface 16, having sufficient thickness, width and length having a surface to accommodate the shape of a wheel having a forward-backward adjustment device 24, an attachment hole 25, located on said front-right surface 13, having sufficient space and material for a mechanical means to attach the said one-piece flat rigid base plate 12 to a supporting substructure surface, an attachment hole 26 located on said front-left surface 14 having sufficient space and material for a mechanical means to attach the said one-piece flat rigid base plate 12 to a supporting substructure surface, a tie-down strap 27 having sufficient thickness, width and length having sufficient space and material for a mechanical means to attach said tie-down strap 27 to top of said front-right wheel chock 17 and to top of said rear-right wheel chock 18 allowing said tie-down strap 27 to be placed over the right wheel being chocked for securing said right wheel, a tie-down strap 28 having sufficient thickness, width and length having sufficient space and material for a mechanical means to attach said tie-down strap 28 to top of said front-left wheel chock 21 and to top of said rear-left wheel chock 22 allowing said tie-down strap 28 to be placed over the left wheel being chocked for securing said left wheel.

CONCLUSION AND SCOPE OF INVENTION

Accordingly, the reader will see that the compact adjustable wheel chock assembly for retainment of multi-size wheels of this invention has the ability to hold in place a vehicle wheel. The wheel chock assembly has the ability to hold a single or two wheels at one time in a fixed position. Furthermore, the wheel chock assembly has the additional advantages in that:

- it provides the ability for the wheel chock assembly to adjust to different vehicle wheel base widths.
- it permits the wheel chock assembly to be attached to a supporting substructure surface.
- it allows the reuse of the wheel chock assembly on different vehicle transporters.
- it provides compactness allowing the wheel chock assembly to be stored as a one-piece assembly.
- it provides a fixed position of the chocked wheel or wheels not allowing the vehicle wheel being chocked to pull loose and do damage to the bed of a pick-up truck, trailer or an other type transporter being used for the substructure.
- it provides protection for the rear window of a pick-up truck since the vehicles chocked wheel is held in a fixed position and cannot come loose from the wheel chock assembly.
- it provides easy and quick installation of the wheel chock assembly to the substructure.

it permits quick vehicle removal from the wheel chock assembly as well as quick removal of the wheel chock assembly from the substructure.

Although the description above contains many specifications, these should not be construed as limiting the scope of the invention but merely providing illustrations of some of the presently preferred embodiments of this invention. For example, the one-piece flat rigid base plate, may be more than one piece, the wheel chocks and said base plate may have other shapes, such as square, oval, trapezoidal, triangular, straight, concave etc. The mechanical device and means for holding the wheel chock assembly to the base plate and the base plate to the substructure may be of different combinations. The material used to construct the wheel chock assembly may be made of wood, steel, cast iron, aluminum, plastic or any combination of these material.

Thus, the scope of the invention should be determined by the appended claims and their legal equivalents, rather than by the examples given.

What is claimed is:

1. A compact adjustable wheel chock assembly for retainment of mult-size wheels which comprises: a one-piece flat rigid base plate having sufficient thickness, width and length having a front-right surface having sufficient area, a front-left surface having sufficient area, a rear-right surface having sufficient area, a rear-left surface having sufficient area, a front-right wheel chock mounted on said front-right surface having sufficient thickness, width and length having sufficient structure and surface to accommodate the shape of a wheel having a sideways adjustment device, a rear-right wheel chock mounted on said rear-right surface having sufficient thickness, width and length having sufficient structure and surface to accommodate the shape of a wheel, having a forward-backward adjustment device, a front-left wheel chock mounted on said front-left surface having sufficient thickness, width and length having sufficient structure and surface to accommodate the shape of a wheel having a sideways adjustment device, a rear-left wheel chock mounted on said rear-left surface having sufficient thickness, width and length having sufficient structure and surface to accommodate the shape of a wheel having a forward-backward adjustment device, an attachment hole located on said front-right surface having sufficient space and material for a mechanical means to attach said one-piece flat rigid base plate to a supporting substructure surface, an attachment hole located on said front-left surface having sufficient space and material for a mechanical means to attach said one-piece flat rigid base plate to a supporting substructure surface, a tie-down strap having sufficient thickness, width and length having sufficient space and material for a mechanical means to attach said tie-down strap to top of said front-right wheel chock and opposite end of said tie-down strap attached to top of said rear-right wheel chock allowing said tie-down strap to be placed over the right wheel being chocked, said tie-down strap having an adjustment means for securing chocked wheel, a tie-down strap having sufficient thickness, width and length having sufficient space and material for a mechanical means to attach said tie-down strap to top of said front-left wheel chock and opposite end of said tie-down strap attached to top of said rear-left wheel chock allowing said tie-down strap to be placed over the left wheel being chocked, said tie-down strap having an adjustment means for securing chocked wheel.

2. The compact adjustable wheel chock assembly for retainment of multi-size wheels according to claim 1 wherein said sideways adjustment device for said front-right wheel chock is sufficiently attached to said one-piece flat rigid base plate and sufficiently attached to said front-right wheel chock allowing sufficient sideways movement of said front-right wheel chock.

3. The compact adjustable wheel chock assembly for retainment of multi-size wheels according to claim 1 wherein said sideways adjustment device for said front-left wheel chock is sufficiently attached to said one-piece flat rigid base plate and sufficiently attached to said front-left wheel chock allowing sufficient sideways movement of said front-left wheel chock.

4. The compact adjustable wheel chock assembly for retainment of multi-size wheels according to claim 1 wherein said forward-backward adjustment device for said rear-right wheel chock is sufficiently attached to said front-right wheel chock allowing said rear-right wheel chock t o move in unison with the sideways movement of said front-right wheel chock is not attached to said one-piece flat rigid base plate but is allowed to slide over the top surface of said one-piece flat rigid base plate.

5. The compact adjustable wheel chock assembly for retainment of multi-size wheels according to claim 1 wherein said forward-backward adjustment device for said rear-left wheel chock is sufficiently attached to said front-left wheel chock allowing said rear-left wheel chock to move in unison with the sideways movement of said front-left wheel chock, said rear-left wheel chock is not attached to said one-piece flat rigid base plate but is allowed to slide over the top surface of said one-piece flat rigid base plate.

* * * * *